(12) United States Patent
Hoshino

(10) Patent No.: US 6,317,181 B1
(45) Date of Patent: Nov. 13, 2001

(54) LIQUID CRYSTAL DISPLAY PANEL

(75) Inventor: Koichi Hoshino, Omiya (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/254,936

(22) PCT Filed: Jul. 17, 1998

(86) PCT No.: PCT/JP98/03232

§ 371 Date: Mar. 17, 1999

§ 102(e) Date: Mar. 17, 1999

(87) PCT Pub. No.: WO99/04314

PCT Pub. Date: Jan. 28, 1999

(30) Foreign Application Priority Data

Jul. 18, 1997 (JP) .................................................. 9-194051

(51) Int. Cl.$^7$ .................................................. G02F 1/1335
(52) U.S. Cl. .................................. 349/98; 349/64; 349/106
(58) Field of Search .................................. 349/97, 98, 99, 349/106, 64

(56) References Cited

U.S. PATENT DOCUMENTS

| 5,686,979 | * 11/1997 | Weber et al. ................... 349/96 |
| 6,025,897 | * 2/2000 | Weber et al. ................... 349/96 |
| 6,124,971 | * 9/2000 | Ouderkirk et al. .............. 349/96 |

FOREIGN PATENT DOCUMENTS

| 0237160 A1 | 9/1987 | (EP) . |
| 54-153066 | 12/1979 | (JP) . |
| 61-103185 | 5/1986 | (JP) . |
| 64-3825 | 1/1989 | (JP) . |
| 2-308106 | 12/1990 | (JP) . |
| 4-218025 | 8/1992 | (JP) . |
| 4-320213 | 11/1992 | (JP) . |
| 5-66380 | 3/1993 | (JP) . |
| 05273548 | 10/1993 | (JP) . |
| 9-61626 | 3/1997 | (JP) . |
| WO 95/17691 | 6/1995 | (WO) . |
| WO 95/17692 | 6/1995 | (WO) . |
| WO 95/27919 | 10/1995 | (WO) . |
| WO 97/01788 | 1/1997 | (WO) . |

* cited by examiner

Primary Examiner—William L. Sikes
Assistant Examiner—Toan Ton
(74) Attorney, Agent, or Firm—Armstrong, Westerman, Hattori, McLeland & Naughton, LLP

(57) ABSTRACT

A liquid crystal display panel comprising a liquid crystal cell with liquid crystals sealed therein, sandwiched between two transparent substrates having an electrode on each of the inner surfaces thereof facing each other, a first polarizing film disposed on the visible side of the liquid crystal cell, a second polarizing film disposed on the opposite side of the liquid crystal cell from the visible side, and a light absorbing film disposed on the opposite side of the second polarizing film from the visible side. The first polarizing film is a reflection-type polarizing film reflecting the light linearly polarized in the direction orthogonal to the transmission axis thereof, and the second polarizing film is an absorption-type polarizing film or color polarizing film each absorbing the light linearly polarized in the direction orthogonal to the transmission axis thereof. A transflective reflector and/or a color filter may preferably be disposed between the second polarizing film and a light source.

11 Claims, 6 Drawing Sheets

LIQUID CRYSTAL DISPLAY PANEL

TECHNICAL FIELD

The invention relates to a liquid crystal display panel used in various electronic equipment such as timepieces (watches and clocks), portable information equipment, and so forth for indicating time information, calendar information and other various information.

BACKGROUND TECHNOLOGY

A timepiece for indicating digital display of time information such as hour, minute, and second, and calendar information such as date, days of the week, month, and year, by use of a liquid crystal display panel (device), has been in widespread use for watches and clocks, provided with a crystal oscillation circuit.

There has also been in use a combination watch wherein analog display indicating time information by the hands of the watch is used in combination with digital display indicating time information and calendar information in numbers and letters.

Further, there has been proposed an analog watch for selectively displaying scales in various patterns, or for displaying simulated hands for an hour hand, a minute hand, and a second hand, by making up the dial thereof based on a liquid crystal display panel (refer to, for example, Japanese Patent Laid-open S54-153066).

A liquid crystal display panel, small in size and consuming very little electric power, has been in widespread use as a display panel for displaying necessary information (character information and graphic information) in various electronic equipment other than timepieces, such as cellular phones, desktop electronic computers, portable game players, and so forth.

In such a liquid crystal display panel, a liquid crystal cell filled with liquid crystals is sandwiched between two transparent substrates having an electrode on respective inner surfaces thereof, facing each other, and an upper polarizing film and a lower polarizing film are disposed, respectively, on the external surface of the transparent substrates, on the opposite sides. If an electric field is applied to the liquid crystals by applying a voltage to a pair of electrodes on the transparent substrates which hold the liquid crystal cell therebetween, the optical property of the liquid crystals is changed, thereby locally controlling transmission and absorption of light falling on the liquid crystal display panel such that a predetermined display is effected.

Either of the upper polarizing film and the lower polarizing film in the conventional liquid crystal display panel is a polarizing film absorbing the light linearly polarized in the direction orthogonal to the transmission axis thereof. Accordingly, light falling on the liquid crystal display panel is controlled to transmit though the two polarizing films or to be absorbed by either of the polarizing films, and there seen is a portion that appears light owing to direct light from a light source or a reflected light when the incident light is reflected on a reflection film, or a portion that appears black because of the interception of the incident light.

In the case of a watch using the conventional liquid crystal display panel described above, time information and calendar information are displayed in white against the black background in normally-black mode when displaying using a back-light illuminated by a light source incorporated therein.

However, in the case of displaying digital information of time and so forth in the liquid crystal display panel, the area of a region (background part) other than the area of the information display part is very large. Accordingly, when indicating digital display of time information and calendar information in white against the black background, light absorbed by the polarizing film is predominant compared with light that is actually used in display. Accordingly, most of the light emitted by the light source is wasted.

Accordingly, it is necessary to increase the amount of luminescence to display with high visual recognition, leading to an increase of the power consumption, causing a problem of shortening the life span of a battery, in the case of portable electronic equipment.

Further, in the panel merely indicating digital display of time information and calendar information in white against the black background, variation in design cannot be offered, with a tendency to quickly lose popularity among consumers. Probably as a result, consumption of digital watches has recently been on the decline. Neither combination watches nor analog watches with a liquid crystal display panel has since received market acceptance.

Similarly, in the case of transmission display by the light source incorporated therein with the conventional liquid crystal display panel used in other electronic equipment, various information expressed in letters and graphics is generally displayed in white against the black background, and although there are some wherein information can be displayed in black against the white background in an inverse mode, the liquid crystal display panel has been found still lacking in design variation and sense of amusement.

In light of the present situation as described, the present invention has been developed, and an object of the invention is to provide a liquid crystal display panel capable of indicating sufficiently visible display even at dark locations where no or little external light is available, and offering novelty and variation in design while ensuring a long service life of a battery used therein.

SUMMARY OF THE INVENTION

To this end, a liquid crystal display panel according to the invention comprises a liquid crystal cell with liquid crystals sealed therein, sandwiched between two transparent substrates having an electrode on each of the inner surfaces thereof facing each other, a first polarizing film disposed on the visible side of the liquid crystal cell, a second polarizing film disposed on the opposite side of the liquid crystal cell from the visible side thereof, and a light source disposed on the opposite side of the second polarizing film from the liquid crystal cell, and is characterized in that the first polarizing film is a reflection-type polarizing film reflecting the light linearly polarized in the direction orthogonal to the transmission axis thereof, and the second polarizing film is an absorption-type polarizing film absorbing the light linearly polarized in the direction orthogonal to the transmission axis thereof.

With the liquid crystal display panel constructed as above, when light emitted from the light source goes out to the visible side after being transmitted through the second polarizing film, the liquid crystal cell, and the first polarizing film, display in white is indicated, however, if the light transmitted through the liquid crystal cell is linearly polarized in the direction orthogonal to the transmission axis of the first polarizing film, the linearly polarized light can not be transmitted through the first polarizing film, and no light is allowed to go out to the visible side, indicating display in black. In this case, as the first polarizing film is a reflection-type polarizing film, the linearly polarized light reaching the first polarizing film is reflected at parts for display in black (including the background part), and returned to the light source after passing through the liquid crystal cell and the second polarizing film again.

The light returned to the light source will have its direction of polarization disturbed while undergoing reflection and scattering repeatedly within the light source, and be approximate to circularly polarized light, going out again from the light source to fall on the second polarizing film to be utilized for display.

Accordingly, even with a light source having a smaller quantity of light emission than that in the case of the conventional liquid crystal display panel, bright display with sufficient visibility can be executed. As a result, the life of a battery can be prolonged due to reduction in consumption of power supplied by the battery.

Further, by stalling a non-reflection layer on the visible side of the first polarizing film, a quantity of light reflected by the first polarizing film can be held down at a low level even at locations such as the outdoors at daytime, and so forth, where an intense external light falls, maintaining excellent visibility.

Then, if a transflective reflector or an optical diffusing layer is installed between the light source and the second polarizing film, a half of the external light falling on the first polarizing film propagates to the liquid crystal cell, a half again of which is transmitted through the liquid crystal cell, and absorbed by the second polarizing film (absorption-type polarizing film) in the background part and parts for display in black.

In parts for display in white, light transmitted through the liquid crystal cell passes through the second polarizing film as it is, only about a half of which is reflected by the transfective reflector and sent out to the visible side via the second polarizing film, the liquid crystal cell, and the first polarizing film.

In such a case, therefore, display of information can be executed with the use of reflected external light only by turning off the power supply to the light source, achieving significant savings in consumption of a battery in use.

Further, by use of a color polarizing film for the second polarizing film, or by installing a color filter between the light source and the second polarizing film, parts for display in white can be indicated in colors differing from the color of light emitted by the light source, enabling a display of information which is highly variable in the tone of color to be effected.

By installing the transflective reflector film between the light source and the second polarizing film, and further, the color filter between the transflective reflector film and the light source, it becomes possible to change the tone of color of the display executed with the use of external light from that using light emitted from the light source, enabling the display highly variable in the tone of color to be effected.

BEST MODE FOR CARRYING OUT THE INVENTION

Preferred embodiments of a liquid crystal display panel according to the invention will be described in detail hereinafter with reference to the attached drawings.

DETAILED DESCRIPTION OF THE INVENTION

First Embodiment: FIGS. 1 to 5

First, a first embodiment of a liquid crystal display panel according to the invention is described with reference to FIGS. 1 to 5.

Figure 1:
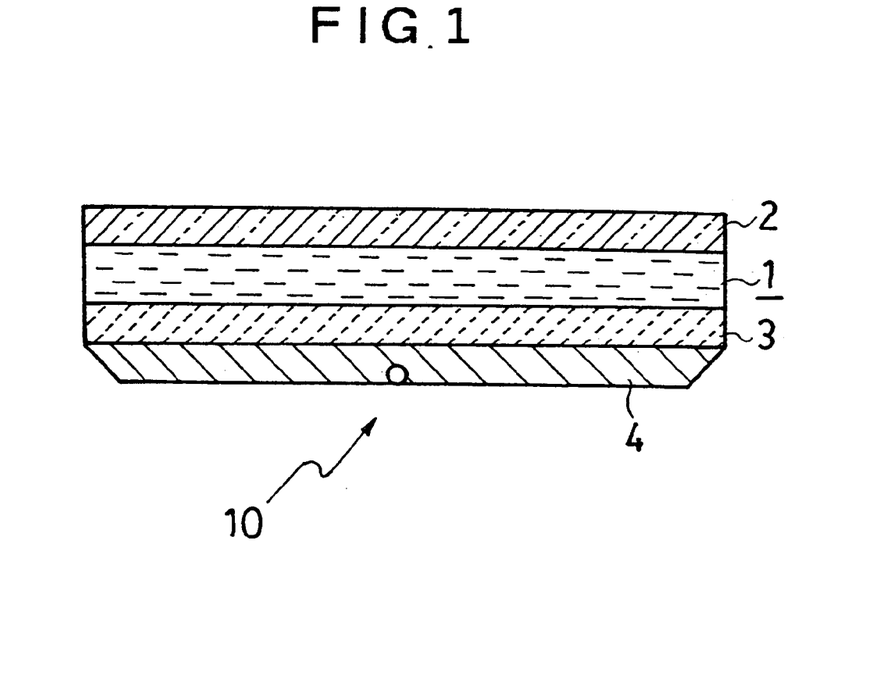
FIG. 1 is a typical sectional view showing the construction of a liquid crystal display panel according to a first embodiment of the invention.
Figure 2:
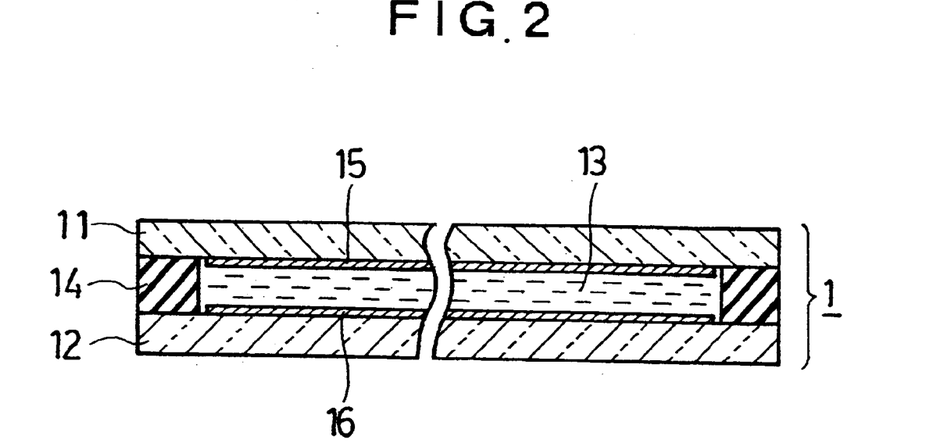
FIG. 2 is an enlarged sectional view of the liquid crystal cell.
Figure 3:
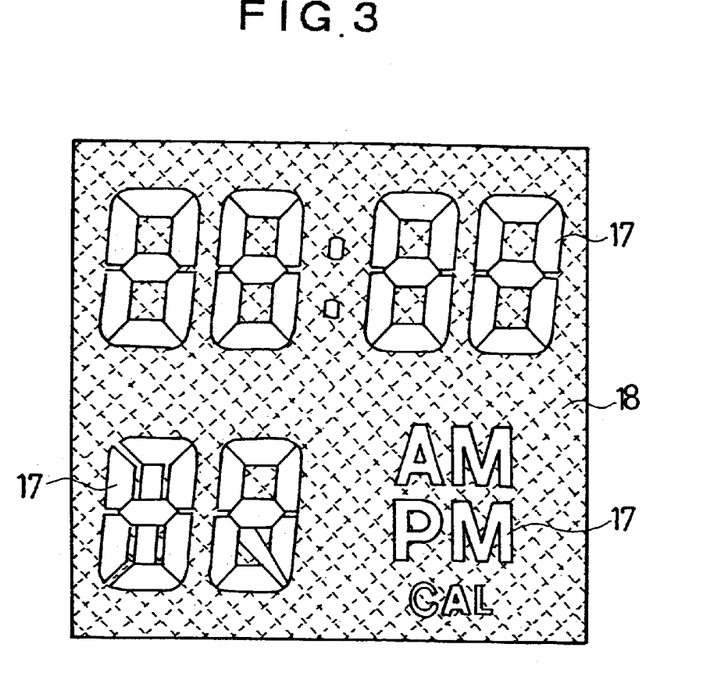
FIG. 3 is a plan view of display segments of the liquid crystal cell showing a pattern thereof by way of example.

FIG. 1 is a typical sectional view showing the construction of the liquid crystal display panel, and FIG. 2 is an enlarged sectional view of a liquid crystal cell incorporated therein, showing a fragmentary sectional view omitting a lengthwise midsection thereof. FIG. 3 is a plan view of display segments of the liquid crystal cell showing a pattern thereof by way of example.

The liquid crystal display panel 10 shown in FIG. 1 is made up of the liquid crystal cell 1, a first polarizing film 2 disposed on the visible side (the upper side in the figure) from a viewer, a second polarizing film 3 disposed on the side (the underside in the figure) of the liquid crystal cell 1, opposite from the visible side, and a light source 4 disposed on the side of the second polarizing film 3, opposite from the liquid crystal cell 1.

As shown in FIG. 2, the liquid crystal cell 1 comprises two glass substrates 11, 12, and liquid crystals 13 sandwiched between the two glass substrates so as to be sealed in with sealing agents 14, and a twisted nematic (TN) liquid crystal having a twist angle, for example, 90° is used for the liquid crystals 13.

Transparent electrodes 15, 16 (opposing electrode and display electrode) made of indium tin oxide (ITO), are formed on the inner faces of the two glass substrates 11, 12, respectively, on the side in contact with the liquid crystals 13, and alignment treatment is further applied to the inner face of the respective transparent electrodes, in contact with the liquid crystals 13, such that liquid crystal molecules are aligned in a predetermined direction.

At least one of the electrode 15 and the electrode 16 of the liquid crystal cell 1 is formed in a pattern of multiple display segments 17 for indicating numbers shown in FIG. 3, and the alignment condition of the liquid crystals 13 held between the transparent electrodes 15, 16, is altered by applying a voltage between the transparent electrodes 15, 16, thereby indicating various information in digital display in a background part 18 by the interaction between the first and second polarizing films 2 and 3.

The first polarizing film 2 shown in FIG. 1 is a sheet-shaped member which transmits the light linearly polarized in the direction parallel with the transmission axis thereof, and reflects the light linearly polarized in the direction orthogonal to the transmission axis thereof, and it is called as reflection-type polarizing film.

As the sheet-shaped reflection type polarizing film (reflection-type polarizing sheet), an optical film, DBEF (trade name), manufactured by Minnesota Mining and Manufacturing Co., U. S. A., is used for. The same can be obtained from Sumitomo Three M Co., Ltd., in Japan.

The reflection-type polarizing film as described above has been developed by the manufacturer described and is disclosed in detail in JP (PCT) H9-507308A (International Publication No.: WO95/17691) and JP (PCT) H9-511844A (International Publication No.: WO95/27919).

Meanwhile, the second polarizing film 3 is a sheet shaped-member which transmits the light linearly polarized in the direction parallel with the transmission axis thereof, and absorbs the light linearly polarized in the direction orthogonal to the transmission axis thereof, and it is a common absorption-type polarizing film.

The reflection-type polarizing film as the first polarizing film 2 and the absorption-type polarizing film as the second polarizing film 3 are arranged in a manner such that the transmission axes thereof are in parallel with each other.

The light source 4 is a back-light that employs an electroluminescence (EL) element, a light-emitting diode (LED) array, a cold cathode tube, or a hot cathode tube or etc.

Now display functions of the liquid crystal display panel 10 are described with reference to FIGS. 4 and 5.

When the light source 4 is lit up, a half of light emitted therefrom and falling on the second polarizing film 3 (absorption-type polarizing film) is absorbed thereby while the rest of the light is turned to the light linearly polarized in the direction parallel with the transmission axis of the absorption-type polarizing film, and falls on the liquid crystal cell 1.

In parts of the display segments 17 shown in FIG. 3, where display is to be indicated in white, the liquid crystals 13 lose the twisting function thereof by the agency of an electric field when a voltage is applied between the electrodes 15, 16 of the liquid crystal cell 1, shown in FIG. 2, and consequently, linearly polarized light falling thereon reaches the first polarizing film (reflection-type polarizing film) 2 without the direction of polarization being rotated when passing therethrough.

Figure 4:
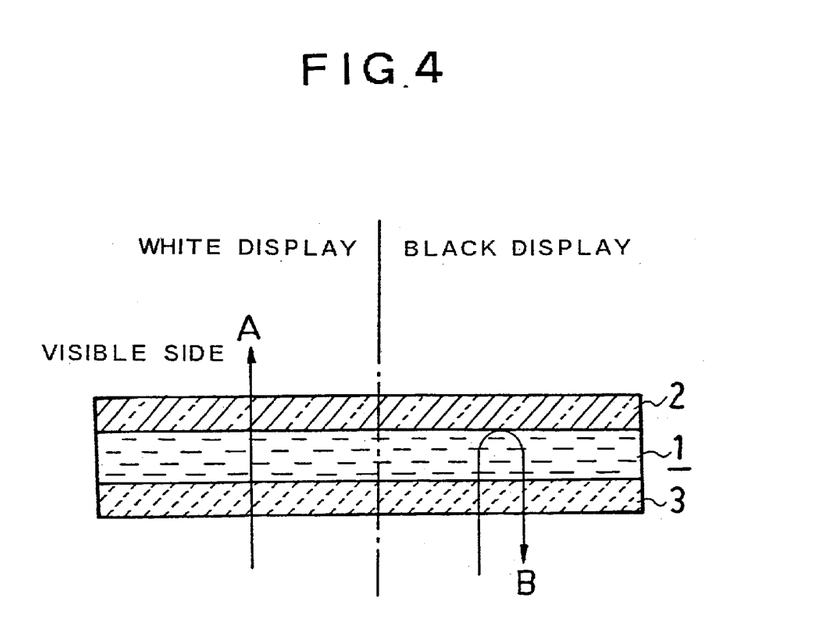
FIG. 4 is a view for explaining the display function of the liquid crystal display panel shown in FIG. 1.

Accordingly, since the linearly polarized light has the polarizing direction parallel with the transmission axis of the first polarizing film 2, the same propagates to the visible side after being transmitted through the first polarizing film 2 as it is as shown by the direction of the arrow A in the left half part of FIG. 4. Therefore, if the light source 4 emits white light, display in white is indicated.

Meanwhile, in the background part 18 shown in FIG. 3, and in parts of the display segments 17, where display is to be indicated in black, linearly polarized light falling on the liquid crystal cell 1 has the polarizing direction rotated by 90 degrees by the liquid crystals (twisted nematic liquid crystals) 13 when passing therethrough since no voltage is applied between the electrodes 15, and 16 of the liquid crystal cell 1 shown in FIG. 2, and it is turned to the light linearly polarized in the direction orthogonal to the transmission axis of the first polarizing film 2 upon reaching there.

Accordingly, the linearly polarized light is reflected by the reflection-type polarizing film, which is the first polarizing film 2, as shown by the direction of the arrow B in the right half part of FIG. 4, and returned to the light source 4 via the liquid crystal cell 1 and the second polarizing film 3. Therefore, no light is sent out to the visible side, indicating display in black.

The light returned to the light source 4 will have the direction of polarization approximate to that of circularly polarized light while undergoing reflection and scattering repeatedly within the light source, and propagate again from the light source 4 to the second polarizing film 3 so as to be reused for display as described in the foregoing. Thus, with this liquid crystal display panel, the light propagating from the light source 4 to the background part, and parts of the display segments for display in black, is reflected by the reflection-type polarizing film, that is, the first polarizing film 2, and sent back to the light source 4 so as to be reused.

Figure 5:
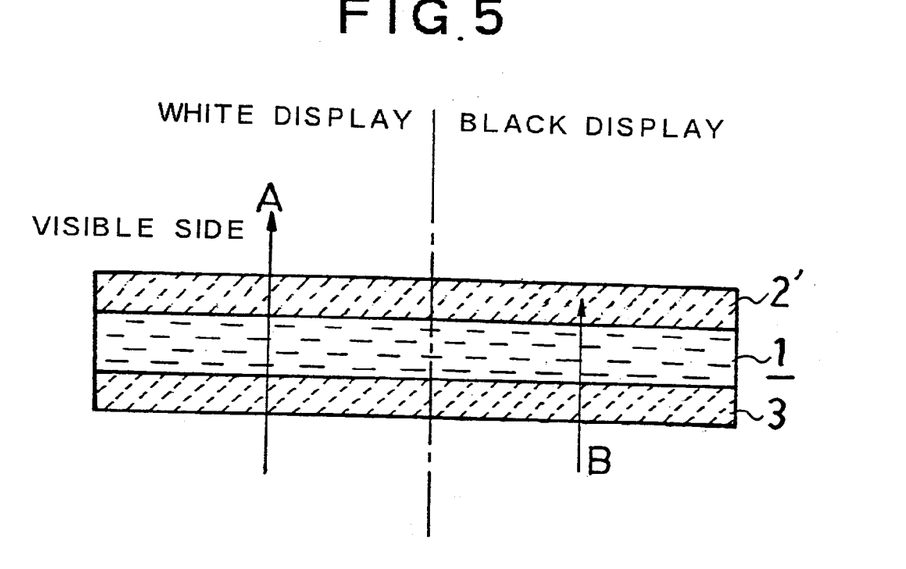
FIG. 5 is a view for explaining the display function of a conventional liquid crystal display panel.

By contrast, with the conventional liquid crystal display panel shown in FIG. 5, an absorption-type polarizing film has been adopted for a first polarizing film 2' disposed on the visible side of the liquid crystal cell 1. Accordingly, as shown in the left half part of the figure, display in white is indicated in the same way as in the case of the liquid crystal display panel according to the invention, however, when display in black is indicated as shown in the right half part of the figure, the light linearly polarized in the direction orthogonal to the transmission axis of the first polarizing film 2' after passing through the liquid crystal cell 1 (as shown by the arrow B) is completely absorbed by the first polarizing film 2', that is, the absorption type polarizing film, not to be utilized again for display.

As is evident from the foregoing, with the liquid crystal display panel 10 according to the invention, it is possible to display time information and so forth with sufficient brightness even if a light emission quantity of the light source 4 is far smaller than that for the conventional liquid crystal display panel. Therefore, electric power consumed by the light source 4 is significantly reduced, enabling the service life of a battery as a power supply source to be prolonged considerably.

Also, with the use of a light source having the intensity of light similar to that for the conventional liquid crystal display panel, clearer and brighter display can be indicated.

It is needless to say that the invention can be applied not only to the liquid crystal display panel to indicate digital display by allowing at least one of the electrodes 15, and 16 of the liquid crystal cell 1 to form in a seven segment pattern of multiple display segments for indicating numbers but also to a liquid crystal display panel to indicate vanous letters and figures by allowing at least one of the electrodes 15,16 of the liquid crystal cell 1 to form in dot-matrix type.

A case where the liquid crystals sealed in the liquid crystal cell are twisted nematic (TN) liquid crystals having a twist angle of 90° or less causing linearly polarized light passing therethrough to undergo phase modulation has been described in the foregoing by way of example, however, supertwisted nematic (STN) liquid crystals having a twist angle of 90° or more may be used instead.

Further, the reflection-type polarizing film, that is, the first polarizing film 2, and the absorption-type polarizing film, that is, the second polarizing film 3, holding the liquid crystal cell 1 interposed therebetween, may be disposed such that respective transmission axes cross each other at an angle equivalent to the twist angle of the liquid crystal cell 1 (90 degrees in the case where twisted nematic liquid crystals having a twist angle of 90° are used for the liquid crystals of the liquid crystal cell 1). In such a case, parts where no voltage is applied to the liquid crystals are displayed in white while parts where a voltage is applied to the liquid crystals are displayed in black.

Second to Sixth Embodiments: FIGS. 6 to 10

Now, second to sixth embodiments of a liquid crystal display panel according to the invention are described with reference to FIGS. 6 to 10.

FIGS. 6 to 10 are typical sectional views showing the constructions of a liquid crystal display panel used in carrying out various embodiments of the invention similar to FIG. 1, parts corresponding to those previously described with reference to FIG. 1 are denoted by the same reference numbers, and description thereof is omitted.

Constructions and operations of the respective embodiments set forth hereunder other than these explained individually are the same as those of the liquid crystal display panel of the aforementioned first embodiment.

Figure 6:
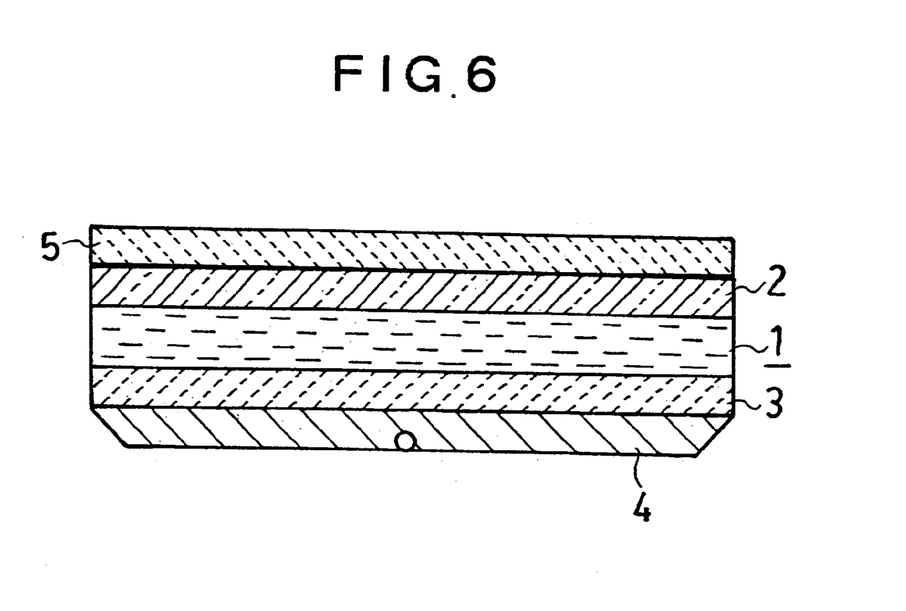
FIGS. 6 to 10 are respectively typical sectional views showing the construction of the liquid crystal display panel according to second to sixth embodiments of the invention.

Second Embodiment:

FIG. 6 shows the construction of a liquid crystal display panel according to the second embodiment of the invention.

As in the case of the liquid crystal display panel 10 shown in FIG. 1, this liquid crystal display panel is provided with the first polarizing film 2, that is a reflection-type polarizing film, and the second polarizing fibn 3, that is an absorption-type polarizing film, respectively, with the liquid crystal cell 1 interposed therebetween, and the light source 4 is provided at the side opposite to the liquid cell 1 of the second polarizing film 3.

The liquid crystal display panel has an absorption-type polarizing film to which non-reflection treatment is applied and which is disposed on the surface of the first polarizing film 2 at the visible side as a non-reflection layer 5.

The reflection-type polarizing film, that is, the first polarizing film 2 has the optical property of reflecting the light linearly polarized in the direction orthogonal to the transmission axis thereof. With the liquid crystal display panel as shown in FIG. 1, therefore, at a location such as the outdoors in fine weather, where a very intense external light falls, a half of the external light falling on the first polarizing film 2 is reflected toward the visible side with the possible result that contrast between parts displayed in white by light transmitted from the light source 4, and the background part as well as parts displayed in black is caused to deteriorate, causing the display to become difficult to see for a viewer.

With the second embodiment of the liquid crystal display panel according to the invention, shown in FIG. 6, however, reflection of external light falling on the first polarizing film 2 toward the visible side is prevented by the non-reflection layer 5, thereby enabling display which is in good contrast and can be easily seen even at locations where an intense external light falls.

Figure 7:
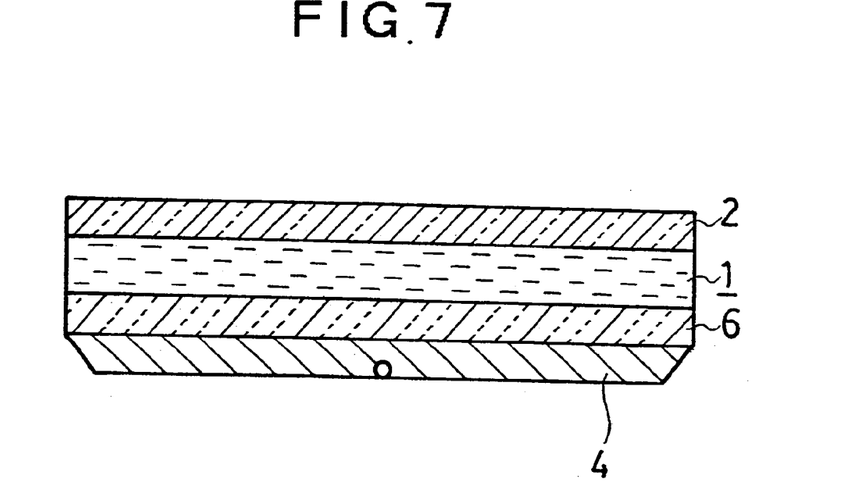

In the second embodiment, an absorption type polarizing film with non-reflection coating applied on the surface thereof on the visible side is used for the non-reflection layer 5. However, the non-reflection layer 5 need not be a polarizing film, and any non-reflection sheet capable of absorbing light reflected by the reflection-type polarizing film may be used for this purpose. Further, the same effect can be obtained by applying non-reflection coating on the surface of the first polarizing film 2, on the visible side, instead of using a non-reflection sheet Third Embodiment:

FIG. 7 shows the construction of a third embodiment of a liquid crystal display panel according to the invention.

The liquid crystal display panel according to this embodiment is provided with a reflection type polarizing film as a first polarizing film 2 disposed on the visible side of a liquid crystal cell 1, a color polarizing film 6 as a second polarizing film disposed on the side of the liquid crystal cell 1, opposite from the visible side thereof, and a light source 4 disposed on the external side of the color polarizing film 6.

The color polarizing film 6 is a sheet prepared by mixing coloring material into or dispersing pigments into an absorption-type polarizing film such that all components of light, in specific colors (at given wavelengths), are transmitted therethrough, while the light linearly polarized in the direction orthogonal to the transmission axis of the color polarizing film and being among components of light in other colors (at other wavelengths) is absorbed.

With this liquid crystal display panel, display in colors differing from the color of light emitted by the light source 4 can be indicated by the agency of the color polarizing film 6 provided on the light source 4 side of the liquid crystal cell 1, enabling a display of information which is highly variable in color and excellent in design to be attained.

For example, in case of using the liquid crystal display panel in a timepiece, it is possible to display time display regions and calendar display regions in different colors with the use of different color polarizing films among the display region, so that a timepiece superior in design quality can be provided.

With the liquid crystal display panel according to the third embodiment as well, a non-reflection layer 5 is preferably installed on the visible side of the first polarizing film 2 as with the case of the second embodiment shown in FIG. 6 so as to prevent reflection of external light falling on the first polarizing film 2 toward the visible side. By so doing, display in good contrast and easy for a viewer to see can be indicated even at locations where an intense external light falls.

Fourth Embodiment

Figure 8:
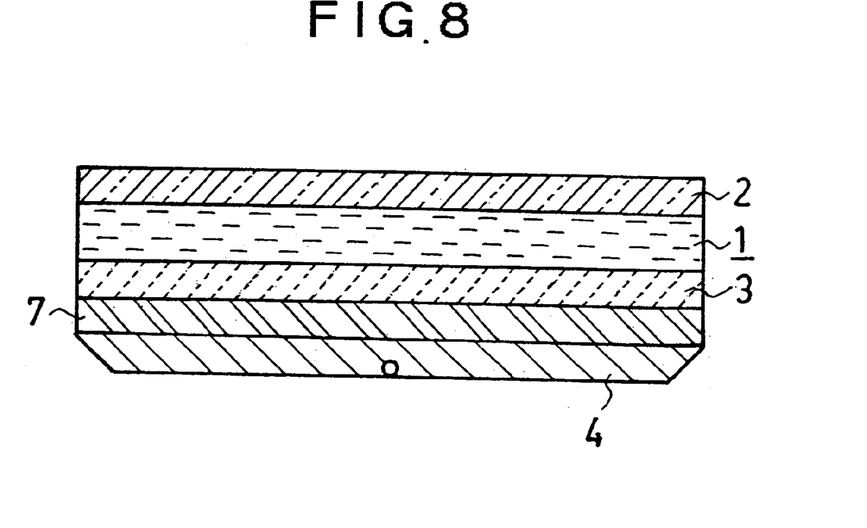

FIG. 8 shows the construction of a fourth embodiment of a liquid crystal display panel according to the invention.

This liquid crystal display panel is made up by installing a color filter 7 between the absorption type polarizing film, that is, the second polarizing film 3, and the light source 4 in the liquid crystal display panel (the first embodiment of the invention) shown in FIG. 1.

With such a liquid crystal display panel as described, display in colors differing from the color of light emitted by the light source 4 can be indicated by the agency of the color filter 7, enabling display of information, highly variable in color and excellent in design quality, to be effected.

In this case, a sheet-shaped color filter as the color filter 7 is disposed throughout the surface of the second polarizing film 3. However, in the case of using the liquid crystal display panel in, for example, a timepiece, it is possible to display a time display region and a calendar display region in different colors either by disposing the color filter 7 differentiated in color among corresponding display parts, or by use of different color filters for respective display regions, thereby providing a timepiece excellent in design quality.

With the liquid crystal display panel shown in FIG. 8, the color filter 7 is disposed between the light source 4 and the second polarizing film 3, however, a location where the color filter 7 is to be disposed is not limited to the above. For example, the color filter 7 may be disposed on the visible side of the first polarizing film 2 instead. If the color filter 7 is disposed throughout the surface of the first polarizing film 2, on the visible side thereof, the same beneficial effect as that for the second embodiment can be obtained since reflection of light by the first polarizing film 2 toward the visible side can be prevented.

Further, although the sheet-shaped color filter may be used as the color filter 7, the color filter 7 may be printed on the glass substrate 11 or 12, making up the liquid crystal cell 1 (refer to FIG. 2), or on the first polarizing film 2 or the second polarizing film 3. If the color filter 7 is formed by printing on the glass substrate 11 or 12, the same can be formed with high precision in relation to the display segments 17 shown in FIG. 3, facilitating display to be indicated in fine detail.

Figure 9:
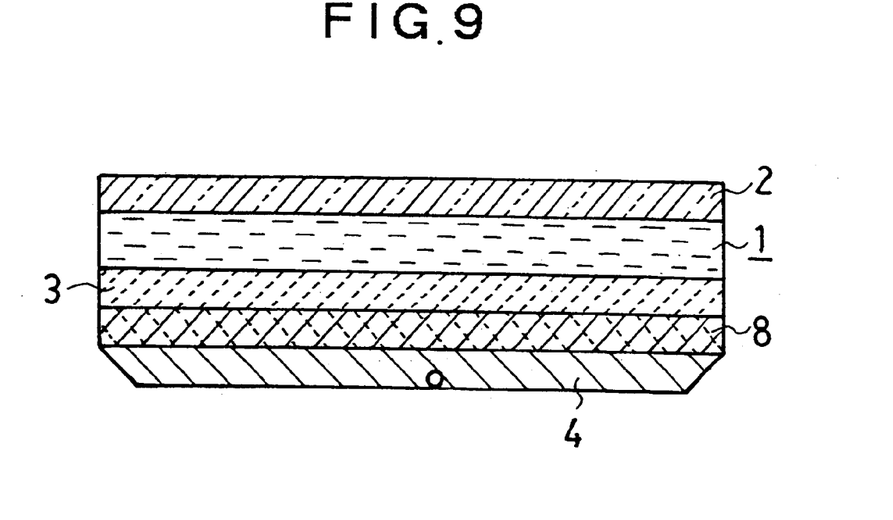

Fifth Embodiment:

FIG. 9 shows the construction of a fifth embodiment of a liquid crystal display panel according to the invention.

This liquid crystal display panel is assembled with a transflective reflector 8 between the absorption-type polarizing film, that is, the second polarizing film 3 and the light source 4 in the liquid crystal display panel (the first embodiment of the invention) shown in FIG. 1.

When the liquid crystal display panel according to the fifth embodiment of the invention is in use at a location such as outdoors in fine weather, where a very intense external light falls on the display, the external light falling thereon is transmitted through a first polarizing film 2, a liquid crystal cell 11, and the second polarizing film 3, then reflected by the transflective reflector 8, and travels out along the optical path in reverse order toward the visible side, indicating display in white. In such a case, therefore, display of information can be executed without the use of light emitted from the light source 4, by turning off the power supply for the light source 4. On the other hand, at a dark location such as the indoors and so forth, where an insufficient external light falls on the display, display is executed with light emitted from the light source 4 by turning on the power supply for the light source 4.

Accordingly, consumption of power from a battery is reduced, enabling the life of the battery to be prolonged.

The same beneficial effect will be obtained by forming an optical diffusing layer in place of the transflective reflector 8 on the light emitting surface of the light source 4 or the surface of the second polarizing film 3, where emitted light falls.

Otherwise, between the color polarizing film 6 and the light source 4 as shown in the third embodiment in FIG. 7, the transflective reflector 8, or the optical diffusing layer may be installed.

Figure 10:
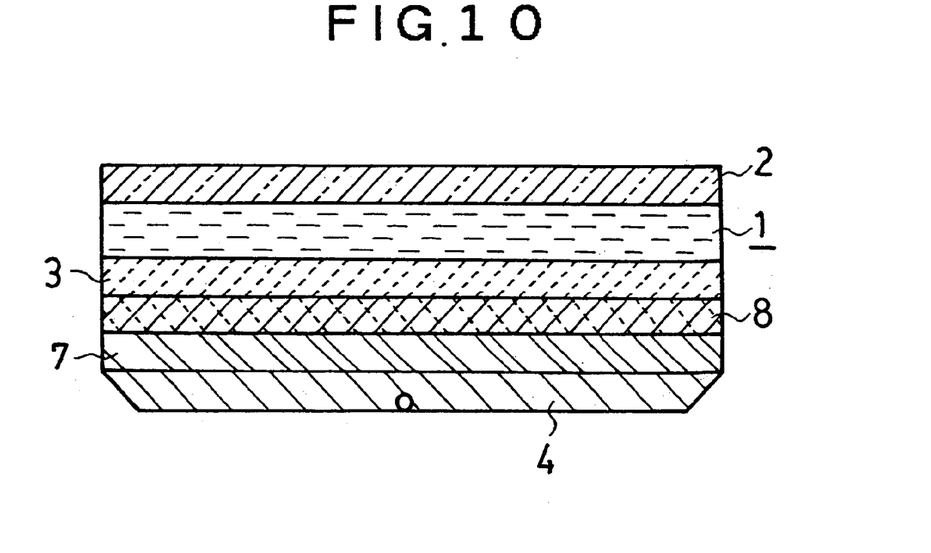

Sixth Embodiment:

FIG. 10 shows the construction of a sixth embodiment of a liquid crystal display panel according to the invention.

This liquid crystal display panel is assembled with a color filter 7 between the transflective reflector 8 and the light source 4 in the liquid crystal display panel (the fifth embodiment of the invention) shown in FIG. 9.

With the liquid crystal display panel according to this embodiment as well, when same is in use at a location such as outdoors in fine weather, where a very intense external light falls on the display, the external light falling thereon which is transmitted through a first polarizing film 2, a liquid crystal cell 1, and a second polarizing film 3 is then reflected by the transflective reflector 8, and travels out along the optical path in reverse order toward the visible side, indicating display in white. In such a case, therefore, display of information can be executed without the use of light emitted from the light source 4, by turing off the power supply for the light source 4.

On the other hand, at a dark location such as the indoors and so forth, where an insufficient external light falls on the dosplay, display is executed by turning on the power supply for the light source 4. In this case, light emitted from the light source 4 is transmitted through the color filter 7, and consequently, light outgoing toward the visible side is a light component only at a specific wavelength (in a specific color) determined by the color filter 7.

Accordingly, it is possible to change the tone of color of the display observed with the use of external light from that observed using light emitted from the light source 4, so that an electronic device superior in design quality can be provided.

In this case as well, the same beneficial effect can be obtained by forming an optical diffusing layer in place of the transflective reflector 8 on the upper surface of the color filter 7 or on the underside surface of the second polarizing film 3.

Figure 11:
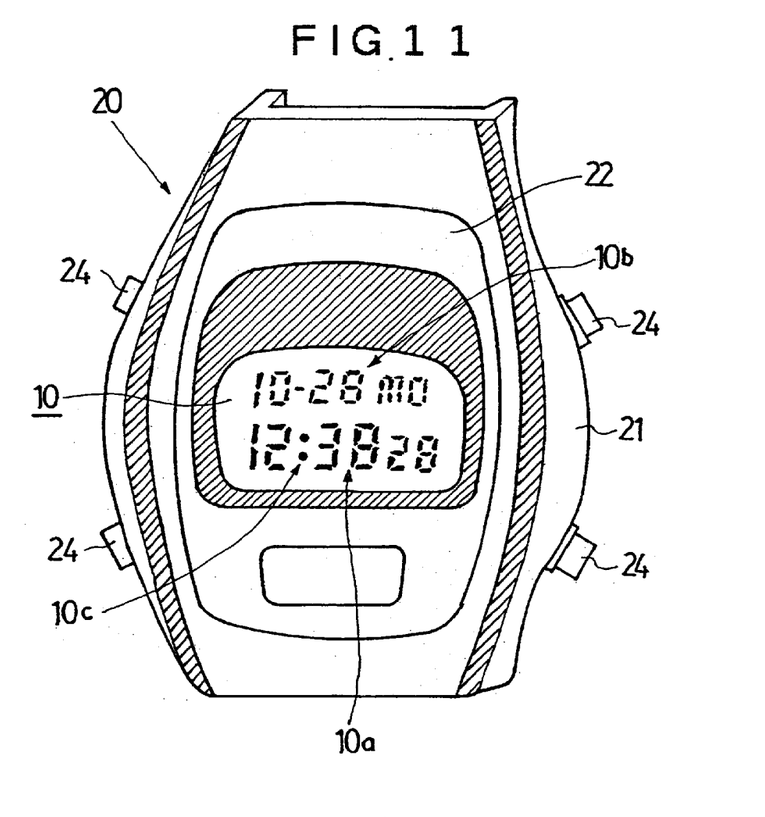
FIG. 11 is an external perspective view of a wrist watch to which the liquid crystal display panel of the invention is applied.
Figure 12:
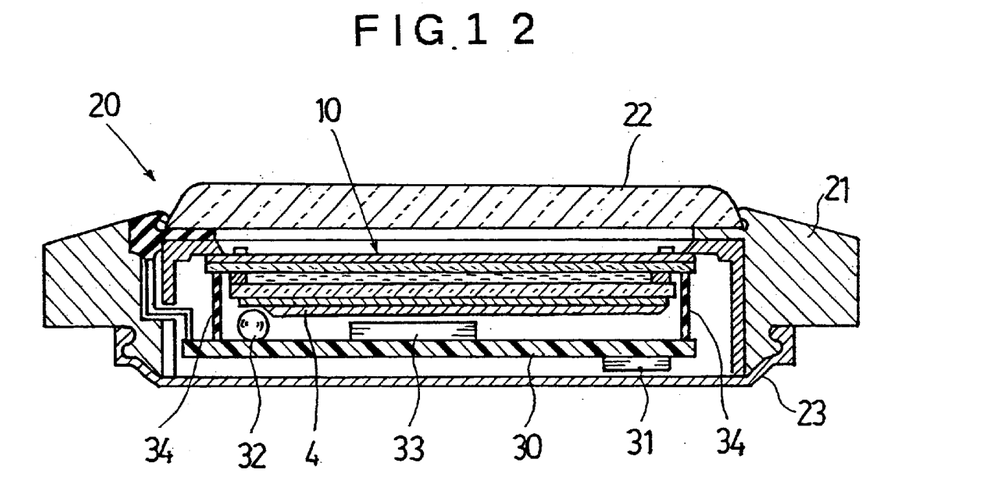
FIG. 12 is a view showing the inner structure of the wrist watch in FIG. 11.

Application Example of Liquid Crystal Display Panel According to the Invention:

Described next is an example of a digital wrist watch in which the liquid crystal display panel that has been explained hitherto is applied. FIG. 11 is a perspective view showing an external appearance of the wrist watch and FIG. 12 is a sectional view showing the internal construction of the wrist watch.

A case 20 of the wrist watch is assembled with a glass 22 and a case back 23, integrally joined with a case body 21 made of metal.

The glass 22 is made of a transparent material such as sapphire glass, tempered glass, or plastic, and is integrally joined with the front face of the case body 21 by means of direct bonding, or fitting therein via a packing. The case back 23 is integrally joined with the back face of the case body 21 by means of screwing therein or fitting therein via a packing. Thus, the case 20 has an airtight inner structure so as not to allow ingress of dust or moisture.

A liquid crystal display panel (liquid crystal display device) 10 according to the invention to serve as a display for indicating time and so forth is installed on the side of the glass 22 inside the case 20.

The liquid crystal display panel 10 comprises a time display section 10*a* for displaying hour, minute, and second, a calendar display section 10*b* for displaying month, date, days of the week, and a colon mark display section 10*c* for blinking every second. These display sections are formed by segment patterns of the transparent electrodes 15, 16 that are formed on the inner surfaces of the glass substrates 11, 12 of the liquid crystal cell 1 shown in FIG. 2.

Further, the liquid crystal display panel 10 is capable of displaying a function of time display for 12 consecutive hours or 24 consecutive hours in a usual fashion, an alarm function, a stopwatch function, a timer function, and so forth.

Changeover among such various functions and correction of time are executed by manipulating a plurality of switching buttons 24 installed in the side of the case body 21 of the case 20. A packing is provided between each of the switching buttons 24 and the case body 21 so as not to allow ingress of dust and moisture into the case 20.

As shown in FIG. 11, the watch has the inner structure such that the liquid crystal display panel 10 and a printed circuit board 30 are disposed substantially in parallel with each other inside the case 20, and a battery 31 serving as a driving power source of the printed circuit board 30 is installed on the case back 23 side of the printed circuit board 30.

A semiconductor integrated circuit 33 comprising a crystal oscillator 32 having an oscillation frequency of 32,768 Hz, a crystal oscillation circuit for generating a predetermined signal by oscillating the crystal oscillator, a frequency divider circuit, a driving circuit for driving the liquid crystal display panel 10, a central processing unit (CPU) for overall control of the quartz watch, and so forth are mounted on the printed circuit board 30.

The liquid crystal display panel 10 is electrically connected with the printed circuit board 30 via a zebra rubber connector 34 disposed therebetween. The zebra rubber connector 34 is disposed so as to be compressed thickness-wise in order to ensure electrical connection between the liquid crystal display panel 10 and the printed circuit board 30.

The zebra rubber connector 34 is made up of electrically conductive layers, comprised of insulating silicone rubber with carbon and metal particles contained therein, is formed at a predetermined pitch, and is electrically conductive in the direction of thickness thereof via the respective electrically conductive layers, but in a transversely insulated condition between adjacent electrically conductive layers. A connection terminal pattern is formed on the faces of the liquid crystal display panel 10 and the printed circuit board 30, opposite to each other, respectively, in such a fashion as to correspond to vertically conductive parts formed of the electrically conductive layer of the zebra rubber connector 34, and insulation parts of the zebra rubber connector 34, alternately disposed, and in dimensions at the same pitch as that for the vertically conductive parts.

With the wrist watch, when pressing either of the switching buttons 24, the light source 4 of the liquid crystal display panel 10 is lit up so that light transmitted through the liquid crystal display panel 10 and emitted by the light source 4 can indicate digital display of time information such as time, minute, and second, and calendar information such as date, days of the week, month, and year in white or various other colors, against the black background.

Conversely, display condition can be inversed between the background part and the information display part so that time information, calendar information and so forth can be displayed in black against white or arbitrary colored background. FIG. 11 shows the display condition.

Any of the liquid crystal display panels described hereinbefore in the first to the sixth embodiments may be used as the liquid crystal display panel 10.

INDUSTRIAL UTILIZATION

As described in the foregoing, with the liquid crystal display panel according to the invention, the reflection-type polarizing film reflecting the light linearly polarized in the direction orthogonal to the transmission axis thereof is disposed on the visible side of the liquid crystal cell.

Accordingly, light emitted from the light source for backlighting and shining on non-display regions and parts for display in black is returned to the light source and put to reuse.

For this reason, a light source having a smaller quantity of light emission than before, that is, consuming less power than in the case of the conventional liquid crystal display panel, will suffice for obtaining display in brightness on the same order as that in the conventional case. Or, by use of a light source having power consumption on the same order as in the conventional case, brighter display with visibility superior to the conventional case can be effected.

Furthermore, by disposing the color polarizing film, the color filter, the transflective reflector, or the optical diffusing layer in place of the absorption type polarizing film between the liquid crystal cell and the light source, it is possible to provide a liquid crystal display panel superior in design quality and capable of indicating colorful display or a liquid crystal display panel capable of indicating display by reflection of external light.

Accordingly, if the liquid crystal display panel according to the invention is applied to use as the display panel for timepieces and various other portable electronic equipment, the life of a battery therein can be prolonged due to lower power consumption, and at the same time, an electronic equipment superior in design quality and capable of indicating display which is brighter and easily seen by a viewer can be provided.

What is claimed is:

1. A liquid crystal display panel comprising:

a liquid crystal cell with liquid crystals sealed therein, sandwiched between two transparent substrates having an electrode on each of the inner surfaces thereof, facing each other;

a first polarizing film disposed on a visible side of the liquid crystal cell;

a second polarizing film disposed on the side of the liquid crystal cell, opposite from the visible side thereof; and a light source disposed on the side of the second polarizing film, opposite from the liquid crystal cell;

wherein at least one of the electrodes is formed in a pattern of display segments or in a dot-matrix type for indicating information, only one polarizing film is disposed on each side of the liquid crystal cell, and the first polarizing film is a reflection-type polarizing film reflecting the light linearly polarized in a direction orthogonal to a transmission axis of the first polarizing film while the second polarizing film is an absorption-type polarizing film absorbing the light linearly polarized in a direction orthogonal to a transmission axis of the second polarizing film.

2. A liquid crystal display panel according to claim 1, wherein a non-reflection layer is installed on the visible side of the first polarizing film.

3. A liquid crystal display panel according to claim 2, wherein the non-reflection layer is a sheet having a non-reflection surface thereon.

4. A liquid crystal display panel according to claim 1, wherein a transflective reflector is installed between the second polarizing film and the light source.

5. A liquid crystal display panel according to claim 1, wherein an optical diffusing layer is installed between the second polarizing film and the light source.

6. A liquid crystal display panel according to claim 1, wherein a color filter is installed between the second polarizing film and the light source.

7. A liquid crystal display panel according to claim 1, wherein a transflective reflector and a color filter are installed between the second polarizing film and the light source.

8. A liquid crystal display panel according to claim 1 wherein the first polarizing film and the second polarizing film are disposed such that the transmission axes thereof run in parallel with each other.

9. A liquid crystal display panel according to claim 1 wherein liquid crystals causing linearly polarized light transmitted therethrough to undergo phase modulation or intensity modulation are sealed in the liquid crystal cell.

10. A liquid crystal display panel according to claim 9, wherein the liquid crystals are twisted nematic liquid crystals.

11. A liquid crystal display panel according to claim 9, wherein the liquid crystals are supertwisted nematic liquid crystals.

* * * * *